(12) United States Patent
Nadaya et al.

(10) Patent No.: US 12,145,444 B2
(45) Date of Patent: Nov. 19, 2024

(54) VEHICLE DISPLAY CONTROL DEVICE, VEHICLE DISPLAY CONTROL SYSTEM, VEHICLE, VEHICLE DISPLAY CONTROL METHOD, AND NON-TRANSITORY STORAGE MEDIUM STORING A PROGRAM

(71) Applicant: TOYOTA JIDOSHA KABUSHIKI KAISHA, Toyota (JP)

(72) Inventors: Yasuaki Nadaya, Toyota (JP); Akinori Shin, Toyota (JP); Takahiro Hirota, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/123,561

(22) Filed: Mar. 20, 2023

(65) Prior Publication Data

US 2023/0364994 A1 Nov. 16, 2023

(30) Foreign Application Priority Data

May 10, 2022 (JP) ................ 2022-077625

(51) Int. Cl.
*B60K 35/00* (2024.01)
*G06F 3/14* (2006.01)
*B60K 35/10* (2024.01)
*B60K 35/22* (2024.01)

(52) U.S. Cl.
CPC ............ *B60K 35/00* (2013.01); *G06F 3/1423* (2013.01); *B60K 35/10* (2024.01); *B60K 35/22* (2024.01); *B60K 2360/143* (2024.01); *G06F 2203/04803* (2013.01); *G09G 2380/10* (2013.01)

(58) Field of Classification Search
CPC ............ B60K 35/00; B60K 2370/143; B60K 2370/152; B60K 35/10; B60K 35/22; B60K 2360/143; B60K 2360/164; B60K 2360/166; B60K 2360/167; B60K 2360/182; B60K 35/23; G06F 3/1423; G06F 2203/04803; G09G 2354/00; G09G 2380/10; G09G 5/10
See application file for complete search history.

(56) References Cited

U.S. PATENT DOCUMENTS

| | | | |
|---|---|---|---|
| 6,396,394 B1* | 5/2002 | Suzuki | B60K 35/00 340/427 |
| 2008/0123322 A1* | 5/2008 | Tane | G09G 3/3611 349/1 |
| 2013/0046149 A1* | 2/2013 | Gettelman | G16H 50/70 600/595 |
| 2017/0269704 A1* | 9/2017 | Akita | B60K 35/00 |
| 2019/0095092 A1* | 3/2019 | Thomas | G06F 3/04883 |
| 2020/0218442 A1* | 7/2020 | Shin | G06F 3/017 |
| 2022/0075585 A1 | 3/2022 | Rathi et al. | |

* cited by examiner

*Primary Examiner* — Patrick N Edouard
*Assistant Examiner* — Joseph P Fox
(74) *Attorney, Agent, or Firm* — Oliff PLC

(57) ABSTRACT

A vehicle display control device includes: a display section that is configured to cause display at a plurality of display areas provided adjacent to each other inside a vehicle cabin; and a display item changing section that is configured to change respective display items displayed at the plurality of display areas by the display section.

10 Claims, 7 Drawing Sheets

VEHICLE DISPLAY CONTROL DEVICE, VEHICLE DISPLAY CONTROL SYSTEM, VEHICLE, VEHICLE DISPLAY CONTROL METHOD, AND NON-TRANSITORY STORAGE MEDIUM STORING A PROGRAM

CROSS-REFERENCE TO RELATED APPLICATION

This application is based on and claims priority under 35 USC 119 from Japanese Patent Application No. 2022-077625 filed on May 10, 2022, the disclosure of which is incorporated by reference herein.

BACKGROUND

Technical Field

The present disclosure relates to a vehicle display control device, a vehicle display control system, a vehicle, a vehicle display control method, and a non-transitory storage medium storing a program.

Related Art

U.S. Patent Application Publication No. 2022/0075585 discloses a vehicle including plural display devices provided adjacent to each other at an instrument panel. In the vehicle described in U.S. Patent Application Publication No. 2022/0075585, information relating to a door closure sensor is displayed at a display device at a left side of a steering wheel, and information relating to a vehicle state is displayed at a display device forward of the steering wheel. Moreover, in the vehicle described in U.S. Patent Application Publication No. 2022/0075585, information relating to plural applications is displayed at a display device at a right side of the steering wheel.

However, in the vehicle described in U.S. Patent Application Publication No. 2022/0075585, an occupant cannot select display items to be displayed at a display area of each display device. This leaves room for improvement from the standpoint of improving occupant comfort.

SUMMARY

The present disclosure provides a vehicle display control device, a vehicle display control system, a vehicle, a vehicle display control method, and a non-transitory storage medium storing a program which can improve occupant comfort.

A first aspect of the present disclosure is a vehicle display control device including: a display section that is configured to cause display at a plurality of display areas provided adjacent to each other inside a vehicle cabin; and a display item changing section that is configured to change respective display items displayed at the plurality of display areas by the display section.

In the vehicle display control device according to the first aspect, the display section causes display at plural display areas provided adjacent to each other inside the vehicle cabin. Moreover, the display item changing section is configured to change respective display items displayed at the plural display areas by the display section. This enables the display items that the occupant wishes to display to be set for each display area. Note that the term "provided adjacent to each other" as used herein refers to a concept including a configuration in which a slight gap is provided between the display areas as long as the occupant does not move their line of sight significantly. Further, note that the term "plural display areas" as referred to herein is not limited to a configuration in which plural physically independent display areas are provided adjacent to each other, and is a concept broadly encompassing a configuration in which a display area displayed by one display device is divided into plural areas.

A second aspect of the present disclosure, in the first aspect, the vehicle display control device may be configured to store information relating to the respective display items displayed at the plurality of display areas.

In the vehicle display control device according to the second aspect, since information relating to the display items set for each display area is stored, there is no need to change the display content each time driving is performed.

A third aspect of the present disclosure, in the first aspect, the display item changing section may be configured to cause display of a display item determined by an operation of an occupant, from plural display item candidates, at one of the display areas.

In the vehicle display control device according to the third aspect, candidates for display items are set in advance, and the content displayed at a display area can be changed simply by selecting the display items that the occupant wishes to display from the candidates.

A fourth aspect of the present disclosure, in any one of the first aspect to the third aspect, may further include: a display item setting section that is configured to set a display item candidate to not be displayed at the plurality of display areas.

In the vehicle display control device according to the fourth aspect, unnecessary display items are set not to be displayed, enabling such display items to be excluded from the candidates, and thereby enabling the burden on the occupant when selecting the display items from the candidates to be reduced.

A fifth aspect of the present disclosure, in the fourth aspect, the display item changing section changes a display item based on a first operation by an occupant at an operable operation switch; and the display item setting section causes display of a setting image at one of the display areas based on a second operation, which is different from the first operation, at the operation switch.

In the vehicle display control device according to the fifth aspect, display items are changed by an occupant performing a first operation at an operation switch. Moreover, by the occupant performing a second operation at the operation switch, a setting image is displayed at a display area. This enables the occupant to use the functionality of both the display item changing section and the display item setting section without providing other operation switches or the like.

A sixth aspect of the present disclosure is a vehicle display control system including: the vehicle display control device of fifth aspect; and a plurality of display areas provided inside the vehicle cabin and facing a driver's seat, and at which display is caused by the vehicle display control device.

In the vehicle display control system according to the sixth aspect, display is performed at plural display areas provided facing the driver's seat. This enables the occupant seated in the driver's seat to quickly check the display content displayed at the plural display areas.

A seventh aspect of the present disclosure, in the sixth aspect, the operation switch may be provided at a steering wheel facing the driver's seat.

In the vehicle according to the seventh aspect, the occupant operates an operation switch provided at the steering wheel so as to be able to change display items for each display area.

A vehicle display control method according to an eighth aspect includes changing respective display items displayed at plural display areas provided adjacent to each other inside a vehicle cabin.

A non-transitory storage medium storing a program according to a ninth aspect is a non-transitory storage medium storing a program that is executable by a computer to perform processing, the processing including changing respective display items displayed at plural display areas provided adjacent to each other inside a vehicle cabin.

As described above, the vehicle display control device, the vehicle display control system, the vehicle, the vehicle display control method, and the non-transitory storage medium storing the program according to the present disclosure enable occupant comfort to be improved.

BRIEF DESCRIPTION OF THE DRAWINGS

An exemplary embodiment of the present disclosure will be described in detail based on the following figures, wherein.

DETAILED DESCRIPTION

Explanation follows regarding a vehicle display control system 10 that is installed with a vehicle display control device 28 according to an exemplary embodiment, with reference to the drawings. Note that the arrow UP illustrated in FIG. 1 indicates an upper side in a vehicle vertical direction, and the arrow RH indicates a right side in a vehicle width direction. The vertical direction and the left-right direction in the following explanation respectively mean the vertical direction in the vehicle vertical direction and the left-right direction in the vehicle width direction.

Figure 1:
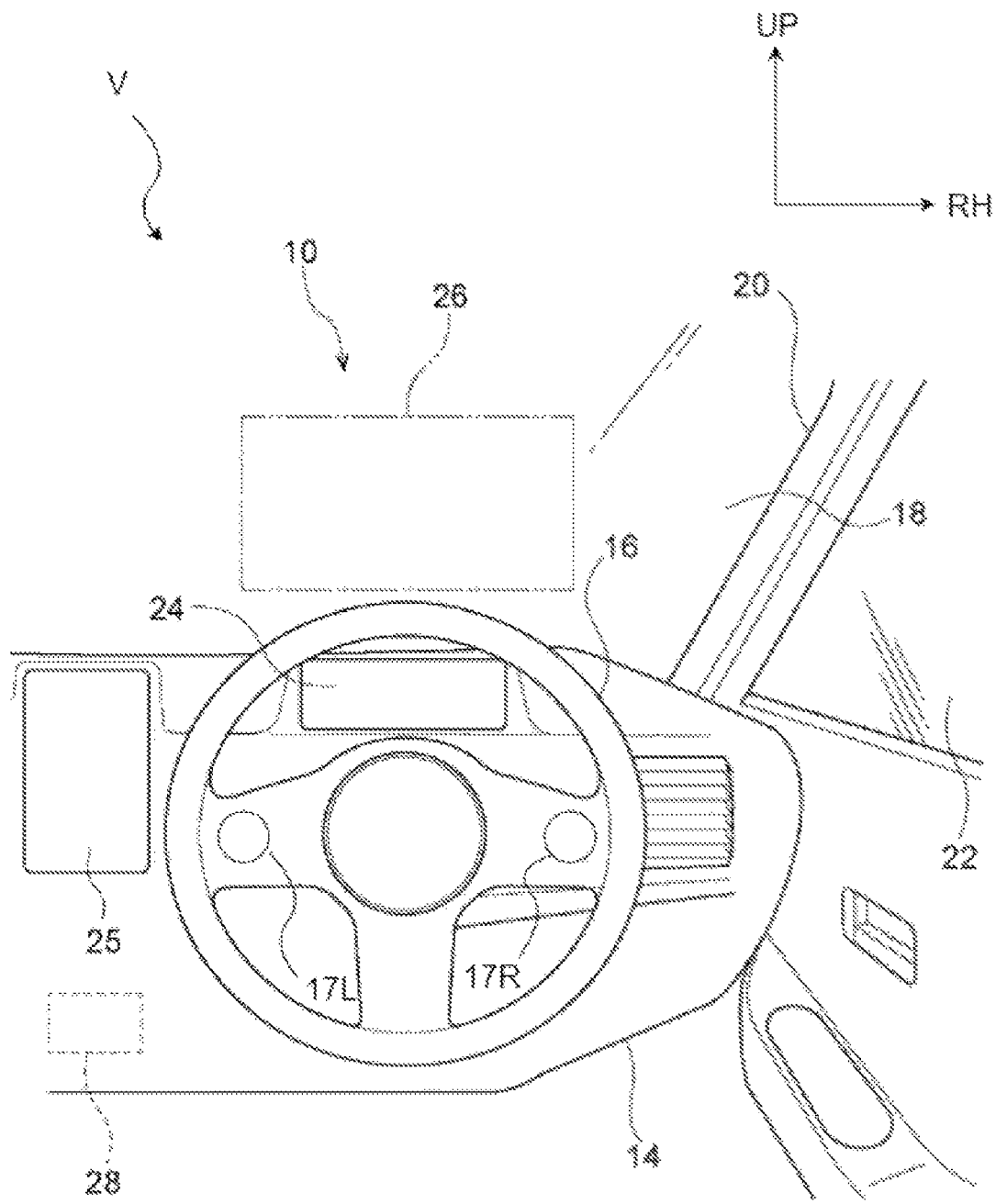
FIG. 1 is a schematic diagram illustrating a front part inside a vehicle cabin, viewed from a vehicle rearward side, of a vehicle to which a vehicle display control system according to an exemplary embodiment has been applied.

As illustrated in FIG. 1, an instrument panel 14 is provided at a front part inside a vehicle cabin of a vehicle V. The instrument panel 14 extends in the vehicle width direction, and a steering wheel 16 is provided at a vehicle right side of the instrument panel 14. Namely, in the present exemplary embodiment, as an example, a right hand drive vehicle is configured with a steering wheel 16 provided on the right side, and a driver's seat is installed on the right side of the vehicle.

A right operation switch 17R and a left operation switch 17L, which serve as operation switches, are provided at the steering wheel 16. The right operation switch 17R is disposed further to a vehicle right side than the center of the steering wheel 16, and the left operation switch 17L is disposed further to a vehicle left side than the center of the steering wheel 16.

The right operation switch 17R of the present exemplary embodiment is formed in a substantially circular shape and is configured to be depressible. Further, the right operation switch 17R is configured to be operable up and down and left and right. The left operation switch 17L of the present exemplary embodiment is formed in a substantially circular shape and is configured to be depressible. Further, the left operation switch 17L is configured to be operable up and down and left and right. Note that there is no particular limitation on the shapes of the right operation switch 17R and the left operation switch 17L.

A windshield glass 18 is provided at a front end part of the instrument panel 14. The windshield glass 18 extends in the vehicle vertical direction and the vehicle width direction to partition the vehicle cabin interior from an exterior of the vehicle cabin.

A vehicle right side end part of the windshield glass 18 is fixed to a front pillar 20 on the vehicle right side. The front pillar 20 extends in the vehicle vertical direction, and the windshield glass 18 is fixed to an inner side end part of the front pillar 20 in the vehicle width direction. Further, a front end part of a front side glass 22 is fixed to an outer side end part of the front pillar 20 in the vehicle width direction. A vehicle left side end part of the windshield glass 18 is fixed to a front pillar (not shown) on the left side of the vehicle V.

A first display 24 is provided at the instrument panel 14. The first display 24 is configured by a meter display provided facing the driver's seat, at the vehicle right side of the instrument panel 14.

A second display 25 is provided at the instrument panel 14, further to the vehicle left side than the first display 24. The second display 25 is configured by a center display provided at a central portion of the instrument panel 14 in the vehicle width direction.

A third display 26 is provided at the windshield glass 18. The third display 26 is set at a vehicle upper side of the first display 24, and is configured by a projection plane projected by a third display device 48 (see FIG. 2), which is a head-up display device. More specifically, the third display device 48 is provided at a vehicle front side of the instrument panel 14, and an image is projected onto the third display 26 of the windshield glass 18 from the third display device 48. Namely, the third display 26 is a part of the windshield glass 18 serving as a projection surface of the third display device 48.

Although explanation follows regarding the content displayed at the first display 24 by the vehicle display control device 28 in the present exemplary embodiment, there is no limitation thereto, and a configuration may be adopted in which the content is displayed at the second display 25 and the third display 26.

The vehicle display control device 28 is provided at the vehicle V. The vehicle display control device 28 of the present exemplary embodiment is, for example, an electronic control unit (ECU) that performs various control.

Hardware Configuration of the Vehicle Display Control System 10

Figure 2:
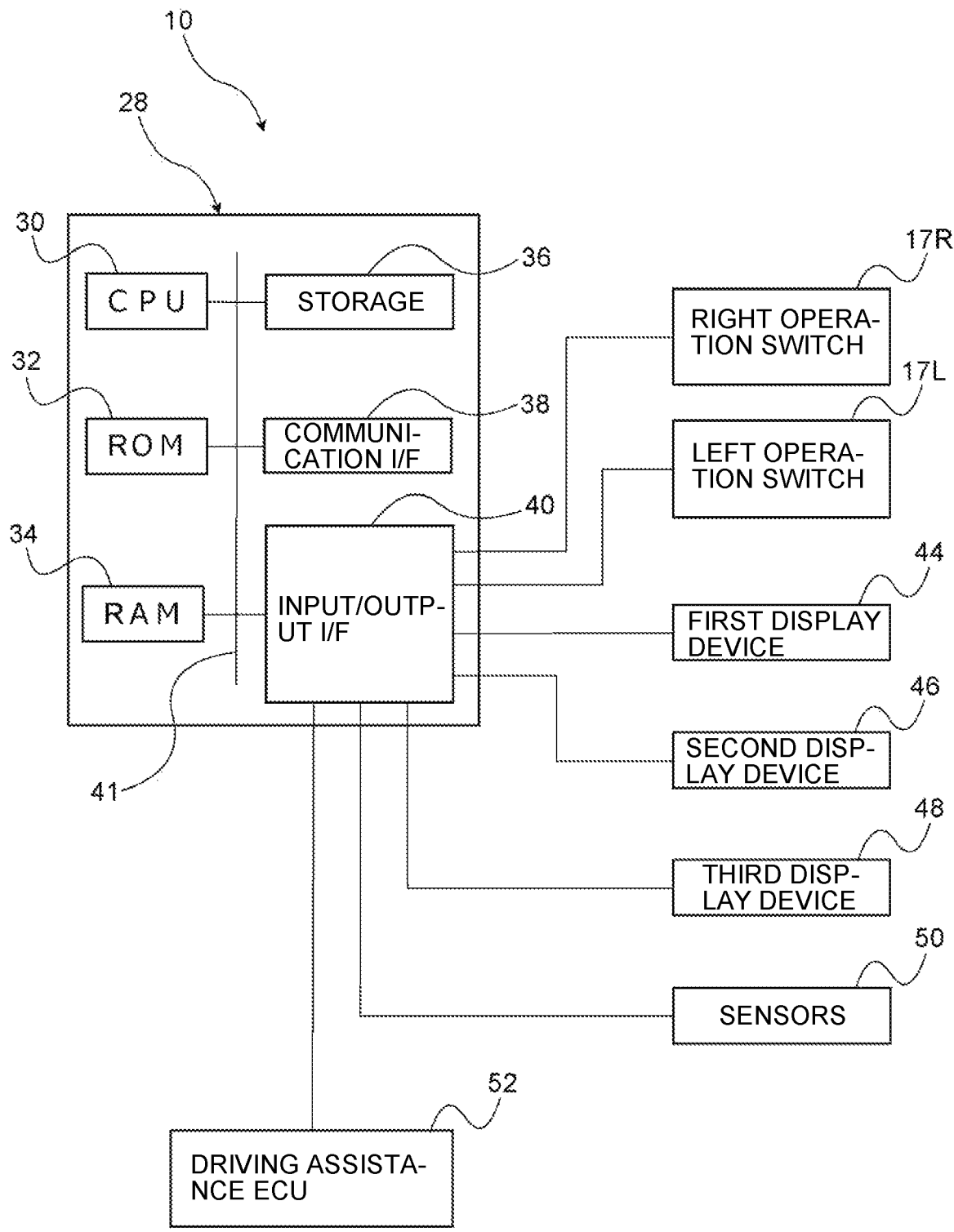
FIG. 2 is a block diagram illustrating a hardware configuration of a vehicle display control system according to an exemplary embodiment.

As illustrated in FIG. 2, the vehicle display control system 10 includes the vehicle display control device 28.

The vehicle display control device 28 includes a central processing unit (CPU; serving as a processor) 30, read only memory (ROM) 32, random access memory (RAM) 34, storage 36, a communication interface (communication I/F) 38, and an input/output interface (input/output I/F) 40. These respective configurations are communicably connected to each other via an internal bus 41.

The CPU 30 is a central processing unit that executes various programs and controls various components. Namely, the CPU 30 reads a program from the ROM 32 or the storage 36, and executes the program using the RAM 34 as a workspace. Further, the CPU 30 controls the respective configurations described above and performs a variety of computation processing in accordance with programs stored in the ROM 32 or the storage 36.

The ROM 32 stores various programs and various data. The RAM 34 serves as a workspace to temporarily store programs and data. The storage 36 is configured by a hard disk drive (HDD) or a solid state drive (SSD), and is a non-transitory recording medium that stores various programs including an operating system, as well as various data. In the present exemplary embodiment, a display program or the like for performing display control processing is stored in the ROM 32 or the storage 36.

The communication I/F 38 is an interface for the vehicle display control device 28 to communicate with an external server and other devices and, for example, a protocol such as a controller area network (CAN), Ethernet (registered trademark), long term evolution (LTE), a fiber distributed data interface (FDDI), or Wi-Fi (registered trademark) is used.

The right operation switch 17R, the left operation switch 17L, a first display device 44, a second display device 46, the third display device 48, and sensors 50 are connected to the input/output I/F 40.

The first display device 44 causes display of an image at the first display 24. The second display device 46 causes display of an image at the second display 25. The third display device 48 causes display of an image at the third display 26.

The sensors 50 include a global positioning system (GPS) device, and the GPS device receives GPS signals from plural GPS satellites to measure the position of the host vehicle. Further, the sensors 50 include peripheral detection sensors such as a radar device and a camera, the radar device being a sensor for detecting an object, such as a pedestrian or another vehicle, present in the periphery of the vehicle V, and the camera being a sensor that captures an image of the periphery of the vehicle V, and outputs the captured image.

Moreover, the sensors 50 include a vehicle speed sensor that directly or indirectly detects and outputs a speed of the vehicle V, an acceleration sensor that directly or indirectly detects and outputs an acceleration of the vehicle V, a steering angle sensor that directly or indirectly detects and outputs a steering angle of the vehicle V, and the like.

The input/output I/F 40 of the vehicle display control device 28 is electrically connected to a driving assistance ECU 52. The driving assistance ECU 52 is a control section that performs driving assistance of the vehicle V without driving operation by an occupant, and the driving assistance ECU 52 is electrically connected to a throttle actuator, a brake actuator, and a steering actuator.

The throttle actuator is an actuator that changes a throttle position of the vehicle V, and the brake actuator is an actuator that changes a braking force generated by a braking device of the vehicle V. Further, the steering actuator is an actuator that changes a steering amount by a steering device of the vehicle V.

Note that the driving assistance ECU 52 is configured to determine the conditions of the vehicle V and its periphery based on information acquired from the sensors 50, and to be able to control the throttle actuator, the brake actuator, and the steering actuator according to the peripheral conditions.

The present exemplary embodiment is configured so as to be able to switch between a driving assistance mode and a manual driving mode, and in the driving assistance mode, as described above, the vehicle V is caused to travel without at least a partial driving operation by the occupant of the vehicle V. On the other hand, in the manual driving mode, the occupant performs all of the driving operations. Note that the driving assistance mode of the present exemplary embodiment includes an autonomous driving mode in which the occupant does not perform driving operation.

Functional Configuration of the Vehicle Display Control Device 28

The vehicle display control device 28 implements various functions using the above-described hardware resources. Explanation follows regarding functional configurations implemented by the vehicle display control device 28, with reference to FIG. 3.

Figure 3:
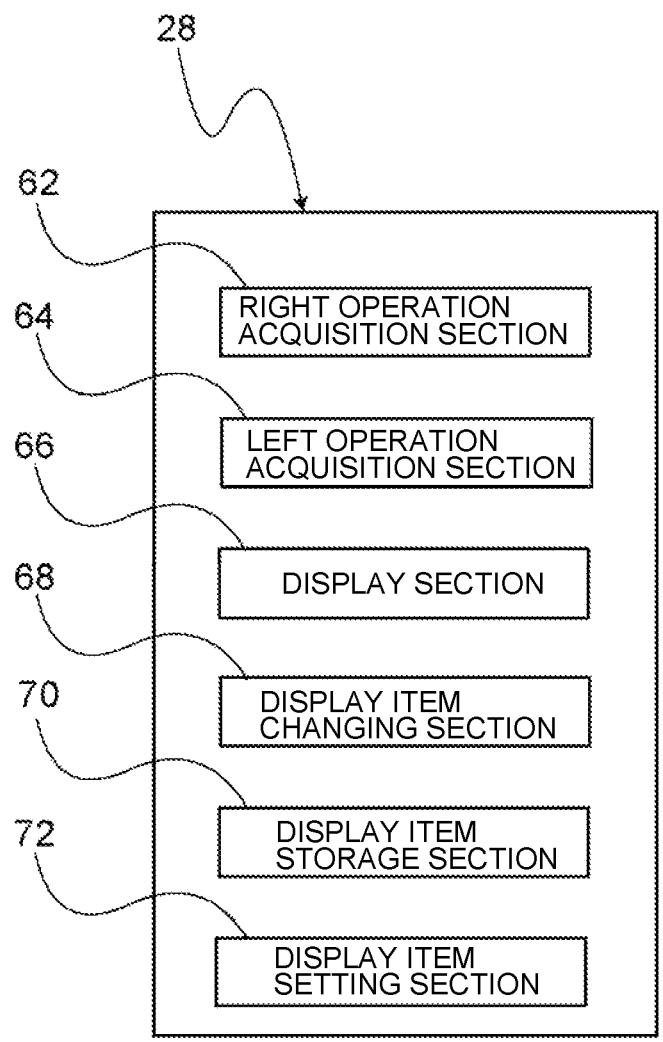
FIG. 3 is a block diagram illustrating a functional configuration of a vehicle display control device according to an exemplary embodiment.

As illustrated in FIG. 3, the functional configuration of the vehicle display control device 28 includes a right operation acquisition section 62, a left operation acquisition section 64, a display section 66, a display item changing section 68, a display item storage section 70, and a display item setting section 72. Note that the respective functional configurations are implemented by the CPU 30 reading and executing programs stored in the ROM 32 or the storage 36.

The right operation acquisition section 62 acquires the operated content in a case in which the right operation switch 17R has been operated. More specifically, the right operation acquisition section 62 acquires whichever one of a first operation or a second operation has been performed at the right operation switch 17R. As an example, in the present exemplary embodiment, the first operation is an operation performed in a case in which the right operation switch 17R is pressed down for a short period of time, and the second operation is a so-called long-press operation in which the right operation switch 17R is pressed down for a long period of time equal to or longer than a predetermined time.

The left operation acquisition section 64 acquires the operated content in a case in which the left operation switch 17L has been operated. More specifically, the left operation acquisition section 64 acquires whichever one of the first operation or the second operation has been performed at the left operation switch 17L.

Figure 4:
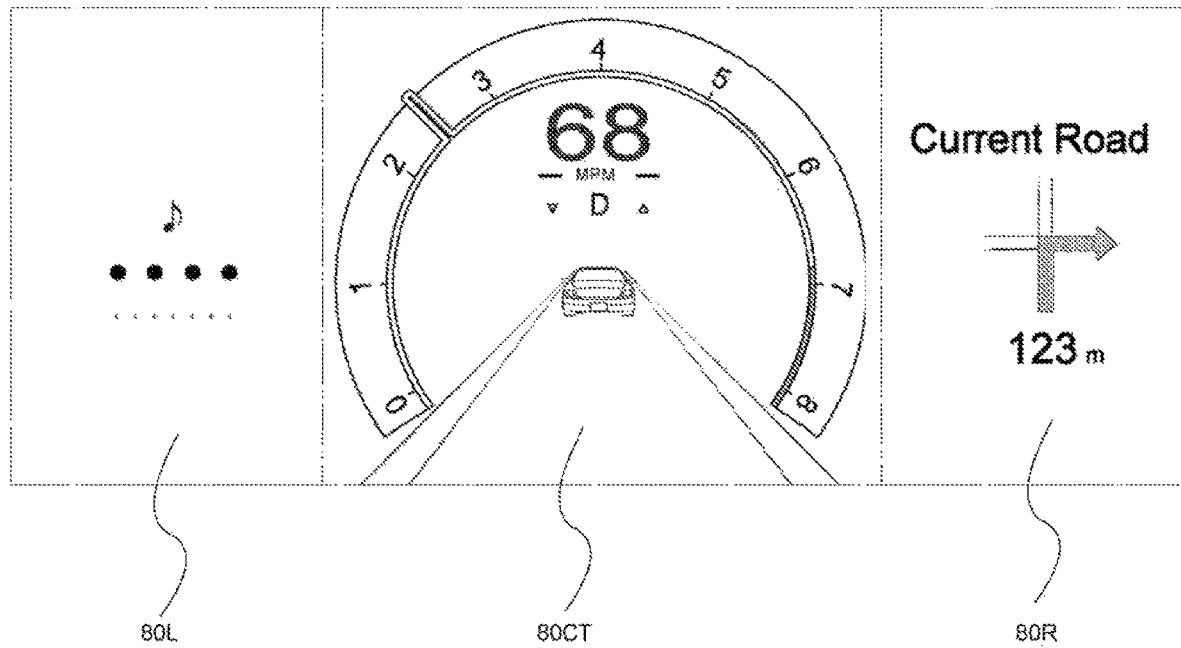
FIG. 4 is a diagram illustrating a display example of display areas in an exemplary embodiment.

The display section 66 causes display of plural display areas provided adjacent to each other, inside the vehicle cabin. More specifically, the display section 66 causes predetermined display at the display areas of the first display 24. FIG. 4 illustrates a display example displayed at the first display 24.

As illustrated in FIG. 4, three adjacent display areas 80CT, 80R, and 80L are provided at the first display 24. Note that although FIG. 4 illustrates a boundary line between adjacent display areas for convenience of explanation, boundary lines are not actually displayed.

The display area 80CT is positioned at a central portion of the first display 24 in the left-right direction, and displays information relating to driving assistance performed by the driving assistance ECU 52. Further, an item indicating the number of revolutions of the engine is displayed in a substantially arc shape at a peripheral portion of the display area 80CT. Moreover, the current speed and shift range of the vehicle V are displayed at the display area 80CT.

The display area 80R is provided adjacent to the display area 80CT, on a right side thereof, and a travel path is illustrated in the display area 80R. More specifically, a distance to an intersection at which a left or right turn is performed is displayed as a numerical value, and the travel path is displayed as an arrow.

The display area 80L is provided adjacent to the display area 80CT, on a left side thereof, and information relating to audio is displayed at the display area 80L. More specifically, information such as a song title of the music that is currently being played is displayed.

The display item changing section 68 illustrated in FIG. 3 changes the display items displayed at the display areas 80CT, 80R, and 80L, for each display area. Moreover, the display item storage section 70 stores information relating to the display items set for each display area. As an example, the present exemplary embodiment is configured so as to be able to store three combinations of display items displayed at the display areas 80CT, 80R, and 80L. The combinations of display items are stored in the storage 36 or an external server or the like.

The display item changing section 68 reads a combination of display items stored in the storage 36 or an external server or the like in response to an operation by the occupant, and displays the combination at the display areas 80CT, 80R, and 80 L. As an example, in the present exemplary embodiment, the display item changing section 68 changes display items in a case in which the occupant performs the first operation at the right operation switch 17R or in a case in which the occupant performs the first operation at the left operation switch 17L.

Figure 5:
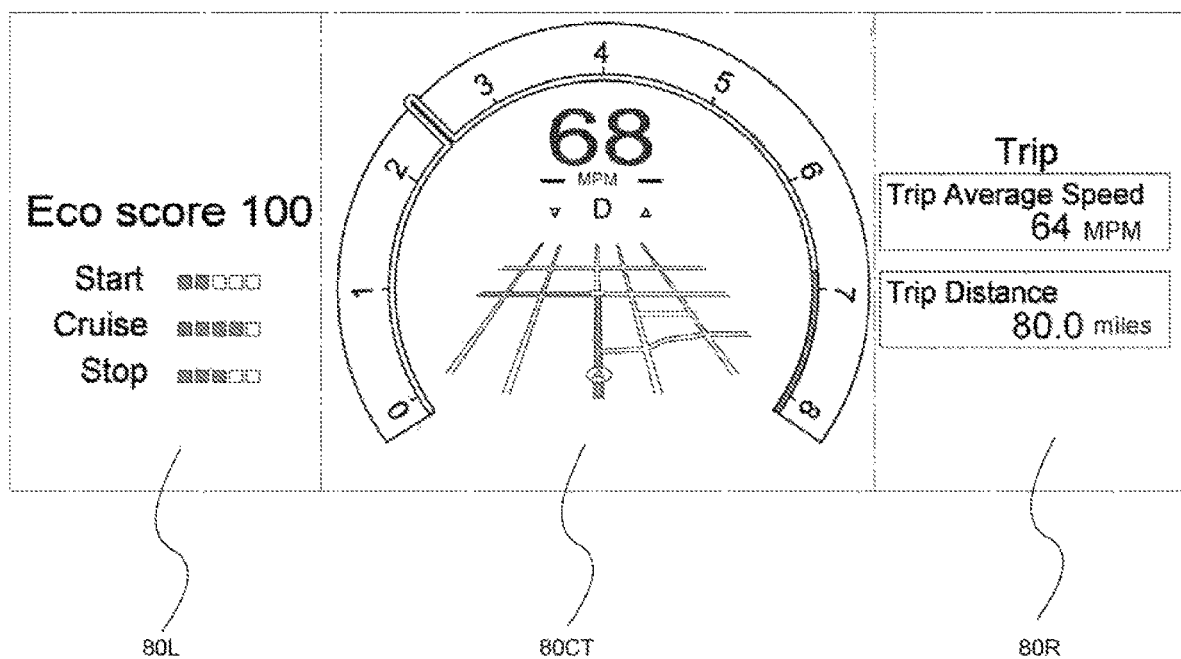
FIG. 5 is a display example illustrating a state in which a first operation has been performed at a right-side operation switch, from the state illustrated in FIG. 4.

For example, in a case in which the right operation acquisition section 62 detects that the first operation has been performed at the right operation switch 17R, the display item changing section 68 changes the display items, thereby transitioning from the state illustrated in FIG. 4 to the state illustrated in FIG. 5.

As illustrated in FIG. 5, map information is displayed at the display area 80CT of the first display 24. More specifically, a map and the current position and travel direction of the vehicle V are displayed at the display area 80CT. Further, similarly to FIG. 4, the number of revolutions of the engine, and the speed and the shift range of the vehicle V are displayed at the display area 80CT. That is, in the present exemplary embodiment, even in a case in which the display items at the display area 80CT are changed by the display item changing section 68, certain information required during travel is not changed and is constantly displayed.

Travel information is displayed at the display area 80R. More specifically, the average speed of the vehicle V is displayed at the upper part of the display area 80R, and the travel distance of the vehicle V is displayed at the lower part of the display area 80R. Since the travel distance can be reset at an arbitrary timing, the distance traveled by the vehicle V after the reset is displayed.

Information relating to low-fuel consumption travel is displayed at the display area 80L. More specifically, a score obtained by evaluating low-fuel consumption travel is displayed at an upper portion of the display area 80L, and evaluation values relating to low-fuel consumption travel are displayed in five levels below the score.

An evaluation value relating to low-fuel consumption travel from a stationary state of the vehicle V until the vehicle V reaches a predetermined speed is displayed next to "Start", and an evaluation value relating to low-fuel consumption travel while the vehicle V is traveling in a predetermined speed range is displayed next to "Cruise". Moreover, an evaluation value relating to low-fuel consumption travel from a predetermined speed of the vehicle V until the vehicle V stops is displayed next to "Stop".

Note that although the display illustrated in FIG. 4 is switched to the display illustrated in FIG. 5 by the occupant performing the first operation at the right operation switch 17R, in a case in which the occupant performs the first operation at the left operation switch 17L in the state illustrated in FIG. 4, other display items are displayed at the first display 24 by the display item changing section 68.

Moreover, when the occupant performs the first operation at the right operation switch 17R from the state illustrated in FIG. 5, other display items are displayed at the first display 24 by the display item changing section 68. Note that in the present exemplary embodiment, three combinations of display items are stored, and the three stored display items are displayed in order each time the occupant performs the first operation at the right operation switch 17R. Accordingly, when the occupant performs the first operation three times at the right operation switch 17R from the state illustrated in FIG. 4, the display items at the first display 24 return to the state illustrated in FIG. 4. Further, each time the occupant performs the first operation at the left operation switch 17L, the three stored display items are displayed in the reverse order. As described above, the display item changing section 68 causes the display items determined by the operation by the occupant, from plural display item candidates, to be displayed at the display areas 80CT, 80R, and 80L of the first display 24.

The display item setting section 72 illustrated in FIG. 3 sets display items for each display area of the first display 24. Moreover, in the present exemplary embodiment, based on the second operation, which is different from the first operation, performed at the right operation switch 17R or the left operation switch 17L, a setting image generated by the display item setting section 72 is displayed at one of the display areas.

More specifically, in a case in which the occupant has performed the second operation at the right operation switch 17R from the state illustrated in FIG. 5, the right operation acquisition section 62 detects that the second operation has been performed at the right operation switch 17R. In this case, the display item setting section 72 causes the display area selected by the occupant to transition to a setting mode.

In the setting mode, the occupant can determine display items from among preset candidates. More specifically, in the setting mode of the display area 80CT, each time the occupant operates the right operation switch 17R or the left operation switch 17L, the display item candidates are switched. The occupant then performs a predetermined operation in a state in which the candidates to be displayed are displayed at the display area 80CT, and thereby the display items of the display area 80CT are determined.

Figure 6:
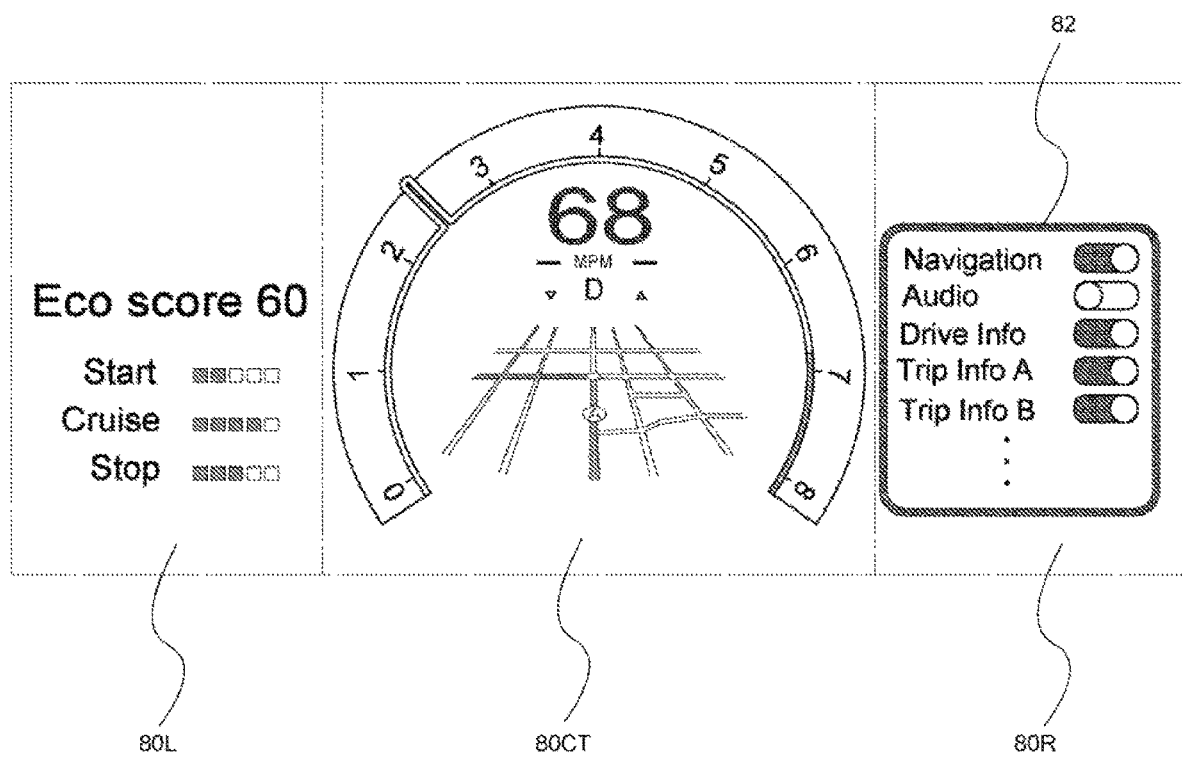
FIG. 6 is a display example illustrating a state in which a second operation has been performed at a right-side operation switch, from the state illustrated in FIG. 5.

Moreover, the display item setting section 72 causes display of the setting image 82 illustrated in FIG. 6 in the setting mode. The setting image 82 indicates whether the display item candidates in the display area 80R are in a display state or a non-display state. In FIG. 6, as an example, evaluation relating to audio are not displayed. Accordingly, in a case in which the display items at the display area 80R are changed, the audio candidates are not displayed but skipped.

Operation

Next, explanation follows regarding operation of the present exemplary embodiment.

Display Control Processing

Figure 7:
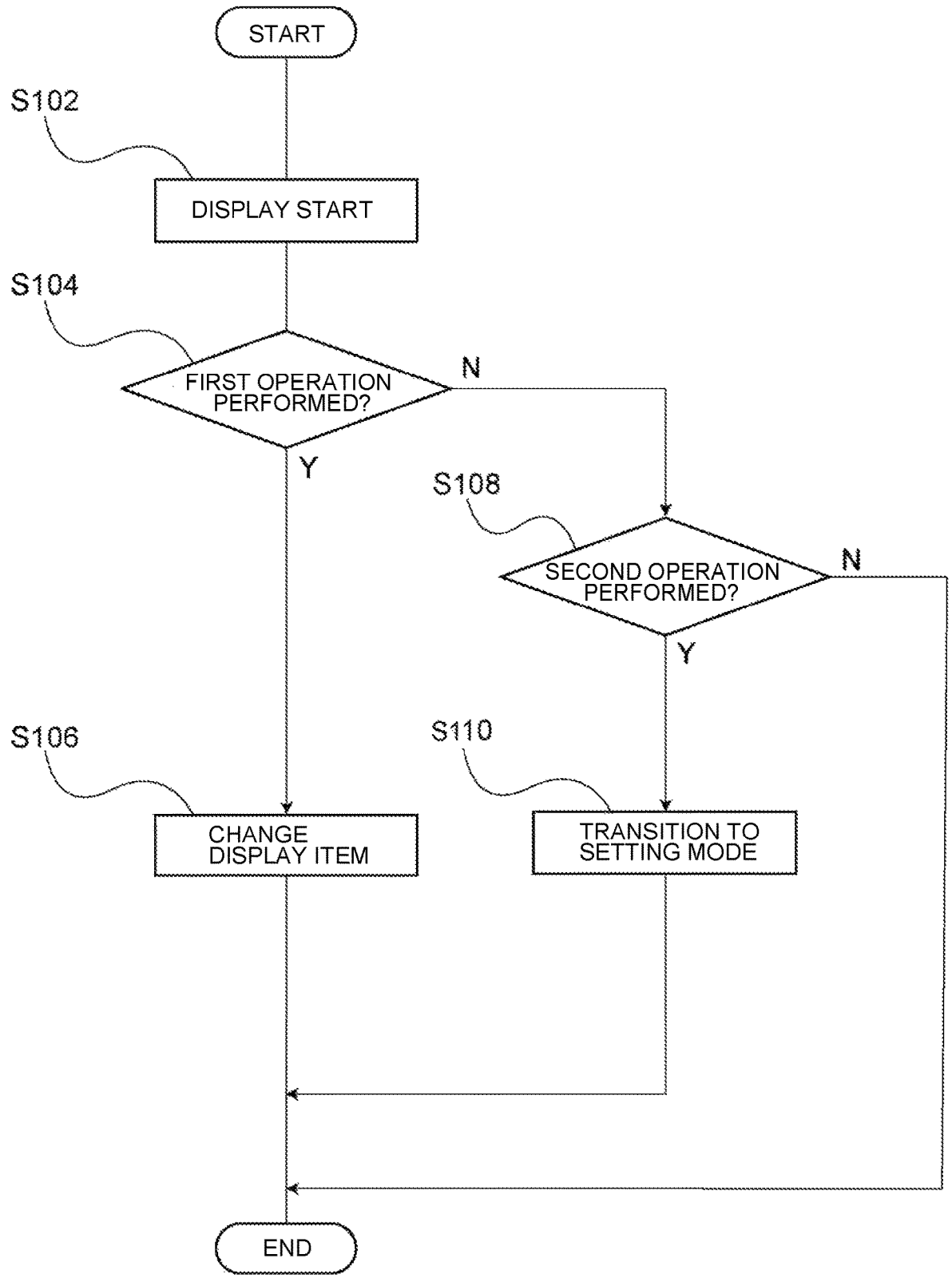
FIG. 7 is a flowchart illustrating an example of a flow of display control processing in an exemplary embodiment.

Explanation follows regarding an example of display control processing performed by the vehicle display control device 28, with reference to the flowchart illustrated in FIG. 7. The display processing is executed by the CPU 30 reading a display program from the ROM 32 or the storage 36, and loading and executing the display program in the RAM 34.

At step S102, the CPU 30 starts display at the first display 24. More specifically, in a case in which the vehicle V has been activated, at step S102, the CPU 30 starts display at the first display 24. Here, the CPU 30 causes display of preset display items at the display area 80CT, the display area 80R, and the display area 80L of the first display 24 using the functionality of the display section 66. For example, the display section 66 may cause display of the display items that were displayed at the time of previous driving.

At step S104, the CPU 30 then determines whether or not the first operation has been performed. More specifically, in a case in which the right operation acquisition section 62 detects that the first operation has been performed at the right operation switch 17R, the CPU 30 determines that the first operation has been performed. Moreover, in a case in which the left operation acquisition section 64 detects that the first operation has been performed at the left operation switch 17L, the CPU 30 determines that the first operation has been performed. Accordingly, in a case in which the first operation has been performed at at least one of the right operation switch 17R or the left operation switch 17L at step S104, the CPU 30 determines that the first operation has been performed, and transitions to the processing of step S106.

At step S106, the CPU 30 changes the display items. More specifically, the CPU 30 causes display of a combination of display items stored in the display item storage section 70 at the first display 24 using the functionality of the display item changing section 68. Then, the CPU 30 ends the display control processing.

On the other hand, in a case in which the CPU 30 determines that the first operation has not been performed at step S104, the CPU transitions to the processing of step S108, and determines whether or not the second operation has been performed. More specifically, in a case in which the right operation acquisition section 62 detects that the second operation has been performed at the right operation switch 17R, the CPU 30 determines that the second operation has been performed. Moreover, in a case in which the left operation acquisition section 64 detects that the second operation has been performed at the left operation switch 17L, the CPU 30 determines that the second operation has been performed. Accordingly, in a case in which the second operation has been performed at at least one of the right operation switch 17R or the left operation switch 17L at step S108, the CPU 30 determines that the second operation has been performed, and transitions to the processing of step S110.

At step S110, the CPU 30 transitions to the setting mode. More specifically, the CPU 30 transitions to a setting mode in which the display items of the display area 80CT, the display area 80R, and the display area 80L can be individually set, using the functionality of the display item setting section 72. For example, the CPU 30 causes display of the setting image 82 illustrated in FIG. 6 using the functionality of the display item setting section 72. Then, the CPU 30 ends the display control processing. Moreover, in a case in which the CPU 30 determines at step S108 that the second operation has not been performed, the display control processing is also ended.

As described above, in the vehicle display control system 10 and the vehicle display control device 28 according to the present exemplary embodiment, the display item changing section 68 changes the display items for each display area for the display items displayed at the plural display areas by the display section 66. This enables the display items that the occupant wishes to display to be set for each display area.

Further, in the present exemplary embodiment, since the display item storage section 70 stores information relating to the display items set for each display area, there is no need to change the display content each time driving is performed.

Moreover, in the present exemplary embodiment, candidates for display items are set in advance, and the content displayed at the display area can be changed simply by selecting the display items that the occupant wishes to display from the candidates.

In addition, in the present exemplary embodiment, the functionality of the display item setting section 72 enables unnecessary display items to be set not to be displayed, enabling such display items to be excluded from the candidates, and thereby enabling the burden on the occupant when selecting display items from the candidates to be reduced.

Moreover, in the present exemplary embodiment, display items are changed by the occupant performing the first operation at the right operation switch 17R or the left operation switch 17L, and a setting image is displayed at one of the display areas by performing the second operation at the right operation switch 17R or the left operation switch 17L. This enables the occupant to use the functionality of both the display item changing section 68 and the display item setting section 72 without providing other operation switches or the like.

Particularly, in the present exemplary embodiment, the right operation switch 17R and the left operation switch 17L are provided at the steering wheel 16, enabling the display items to be easily changed even in a state in which the occupant has oriented their line of sight forward.

Although explanation has been given regarding the vehicle display control system 10 and the vehicle display control device 28 according to the present exemplary embodiment, obviously various embodiments may be implemented within a range not departing from the gist of the present disclosure. For example, although explanation has been given regarding a configuration in which the right operation switch 17R and the left operation switch 17L are provided at the steering wheel 16 in the above-described exemplary embodiment, there is no limitation thereto, and an operation switch may be provided at another location.

Although the right operation switch 17R and the left operation switch 17L are configured to be depressible in the above-described exemplary embodiment, there is no limitation thereto. For example, a touch type operation switch using an electrostatic sensor or the like may be used.

Further, although the three display areas 80CT, 80R, and 80L are provided in the above-described exemplary embodiment as illustrated in FIG. 4, there is no limitation thereto. For example, the present disclosure may be applied to a configuration including four or more display areas. Moreover, the present disclosure is not limited to a configuration in which the display areas are adjacent in the vehicle width direction, and a configuration in which the display areas are adjacent in the vehicle vertical direction may be adopted.

Further, the display items described in the above exemplary embodiment are examples, and display items are not limited to these display items. For example, display items other than the display items described in the above exemplary embodiment may be displayed at the first display 24.

What is claimed is:

1. A vehicle display control device, comprising comprising:
a processor configured to:
display a plurality of display areas on a display provided inside a vehicle cabin; and
change respective display items respectively displayed at the plurality of display areas, per display area, wherein
the plurality of display areas comprises a first display area and at least one second display area provided adjacent to the first display area,
the first display area is a meter display area, and the at least one second display area is not a meter display area,
an item indicating a number of revolutions of an engine is displayed in an arc-shaped image at a peripheral portion of the first display area, and
at least one of information relating to driving assistance performed and map information is disposed within the arc-shaped image of the first display area;
even when the display items at the first display area are changed, constantly displaying certain information corresponding to a first type of display items that cannot be changed in the first display area; and
in response to an operation to switch display states, transitioning the display items at the at least one second display area from a state of displaying one type of a plurality of second types of display items to a state of displaying a different type of the plurality of second types of display items.

2. The vehicle display control device according to claim 1, wherein the processor is configured to:
store information relating to the respective display items displayed at the plurality of display areas.

3. The vehicle display control device according to claim 1, wherein the processor is configured to:
cause display of a display item determined by an operation of an occupant, from a plurality of display item candidates, at one of the plurality of display areas.

4. The vehicle display control device according to claim 1, wherein the processor is configured to:
set a display item candidate to not be displayed at the plurality of display areas.

5. The vehicle display control device according to claim 4, wherein the processor is configured to:
change a display item based on a first operation by an occupant at an operable operation switch; and
display a setting image at one of the plurality of display areas based on a second operation, which is different from the first operation, at the operable operation switch.

6. A vehicle display control system, comprising:
the vehicle display control device according to claim 5; and
a plurality of display areas provided inside the vehicle cabin and facing a driver's seat, and at which display is caused by the vehicle display control device.

7. A vehicle comprising:
the vehicle display control system according to claim 6, wherein the operable operation switch is provided at a steering wheel facing the driver's seat.

8. The vehicle display control device according to claim 1, wherein
the meter display area is disposed at a center of the display, and
the plurality of display areas includes more than one second display areas, which are disposed adjacent to the meter display area on left and right sides thereof.

9. A vehicle display control method, comprising:
displaying, by a processor, at a plurality of display areas on a display provided inside a vehicle cabin; and
changing, by the processor, respective display items respectively displayed at the plurality of display areas, per display area, wherein
the plurality of display areas comprises a first display area and at least one second display area provided adjacent to the first display area,
the first display area is a meter display area, and the at least one second display area is not a meter display area,
an item indicating a number of revolutions of an engine is displayed in an arc-shaped image at a peripheral portion of the first display area, and
at least one of information relating to driving assistance performed and map information is disposed within the arc-shaped image of the first display area;
even when the display items at the first display area are changed, constantly displaying certain information corresponding to a first type of display items that cannot be changed in the first display area; and
in response to an operation to switch display states, transitioning the display items at the at least one second display area from a state of displaying one type of a plurality of second types of display items to a state of displaying a different type of the plurality of second types of display items.

10. A non-transitory storage medium storing a program that is executable by a computer to perform processing, the processing comprising:
displaying, by a processor, at a plurality of display areas on a display provided inside a vehicle cabin; and
changing respective display items respectively displayed at the plurality of display areas, per display area, wherein
the plurality of display areas comprises a first display area and at least one second display area provided adjacent to the first display area,
the first display area is a meter display area, and the at least one second display area is not a meter display area,
an item indicating a number of revolutions of an engine is displayed in an arc-shaped image at a peripheral portion of the first display area, and
at least one of information relating to driving assistance performed and map information is disposed within the arc-shaped image of the first display area;
even when the display items at the first display area are changed, constantly displaying certain information corresponding to a first type of display items that cannot be changed in the first display area; and
in response to an operation to switch display states, transitioning the display items at the at least one second display area from a state of displaying one type of a plurality of second types of display items to a state of displaying a different type of the plurality of second types of display items.

* * * * *